Patented Oct. 13, 1936

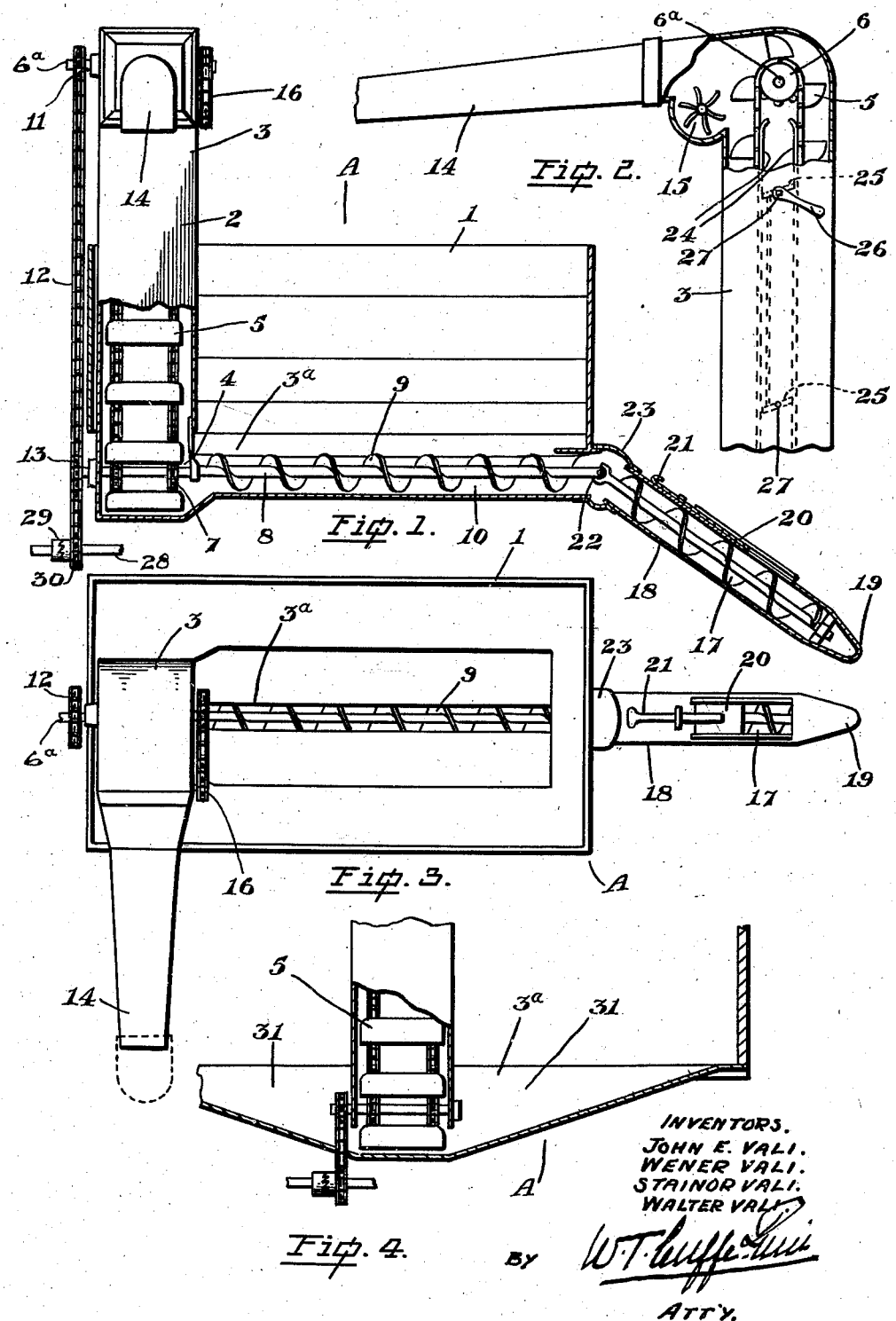

2,057,403

UNITED STATES PATENT OFFICE 2,057,403

LOADING AND UNLOADING MACHINE

John Eddie Vali, Wener Vali, Stainor Vali, and Walter Vali, Sylvan Lake, Alberta, Canada Application November 3, 1934, Serial No. 751,288
In Canada November 20, 1933

4 Claims. (Cl. 214—83)

This invention relates to loading and unloading machines generally and more particularly to improved means of this description for loading, transporting and unloading material such as grain and the like.

An object of this invention is to provide loading and unloading apparatus adapted to or built into a motor truck where in combination with the truck grain and such like can be quickly and efficiently loaded, transported and unloaded without loss or damage.

A further object is to provide apparatus in combination with a motor truck and drivable by the engine of the truck through a suitable power take-off for loading and unloading grain and the like.

With the foregoing and other objects hereinafter more fully referred to, the invention comprises an elevator provided with an unloading or discharge spout, a conveyor co-operative with the elevator, selectively or collectively operable therewith through a common shaft, in turn operable by a suitable power take-off shaft, and manually operable means associated with the elevator for locking the movable parts thereof such as the bucket line.

The invention will be best understood by reference to the following description when taken in connection with the accompanying illustrations of specific forms or embodiments thereof, while the scope of the invention will be more particularly pointed out in the claims.

Referring now to the drawings and to the embodiments of the invention therein disclosed for illustrative purposes only, in which like numerals of reference indicate corresponding parts in each figure:—

Fig. 1 is a sectional elevation of a truck equipped with the loading and unloading mechanism or apparatus.

Fig. 2 is a sectional end view of the elevator showing the clamps for holding the bucket line stationary when in transit from one point to another.

Fig. 3 is a top plan view.

Fig. 4 is a detail of a modified form of the apparatus.

Referring now more particularly to the drawing in which for example a conventional truck body A with sides 1 is shown equipped with loading and unloading mechanism or apparatus for grain and the like, and which may be detachably connected to, or built into, the body 1. The mechanism or apparatus comprises an elevator 2, as here shown, of standard grain elevator type, but other types may, as required, be used. A suitable casing 3 is provided for the elevator, co-operating with and adapted to extend through the floor 3a of the body, as at 4. Within the casing 3 is the bucket line 5 with pairs of bucket chain wheels 6 and 7, the top wheels 6 being suitably supported on a shaft 6a, while the lower bucket wheels 7 are mounted on a shaft 8 extending beneath the floor 3a of the body 1, and hereinafter more fully referred to. It may here be noted that the bucket chain wheels 7 are a loose running fit on the shaft 8, which allows an auger 9 on the said shaft 8 to rotate at a different speed to the member 7, and thus provides co-operative relationship in operation between the elevator 2 and the feed auger 9. This auger or spiral feed 9 rotates in a suitable casing 10 positioned longitudinally in or immediately beneath the floor 3a of the body 1, sufficient room being provided between the floor and the auger for chutes and volume regulator shutter (not shown) for regulating the volume and conducting the material being handled onto the auger 9. Belt-pulleys may be used instead of chain wheels.

The elevator 2, as here shown, is driven from the top through the shaft 6a, the bucket chain wheels 6 and sprocket 11 on the shaft 6a, and connected by a chain 12 to a sprocket 13 on the auger shaft 9, so that the latter rotates irrespectively of the bucket chain wheels 7 loosely mounted thereon; or the auger shaft 9 may form the shaft for the bottom of the bucket line 5.

For unloading or discharging material such as grain or the like we provide the elevator 2 with a swingingly mounted discharge chute 14 of any suitable length, with or without extensions, and at a convenient point in chute 14 a suitably arranged fan blower 15 to assist in the movement of material being loaded or unloaded. This blower is operated from the top shaft 6a of the elevator through a suitable drive 16.

Referring now to the loading or feed means mechanism, this comprises the auger 9 already described, and which may be provided with an extension auger 17 for the intake of material from the point of loading, and is provided with a suitable casing 18 tapered at one end as at 19, with a volume control gate 20 having an operating handle 21. The extension auger 17 is driven with the main auger 9 through a universal coupling 22, while the casing 18 is coupled to the casing 10 by means of a flexible collar band 23. The blower 15 may be otherwise located as required.

A feature of the invention includes the means for preventing the bucket line 5 of the elevator from moving when in transit, and comprises presser bars 24 operated by toggle cross members 25 and operable by a lever handle 26 (see Fig. 2). The toggle members 25 are mounted on pins 27, which in turn are anchored in the elevator housing or casing 3, so that on the lever handle 26 being moved downwardly, the toggle members 25 are moved to a horizontal position to press the presser bars or plates 24 against the bucket line and thus retain it rigidly against vibration while the body is travelling from one point to another with the elevator inoperative.

The power for driving the apparatus is derived from an engine (not shown), and is transmitted through a power take-off shaft 28 provided with a safety clutch 29 to prevent breakage or damage caused by jamming etc. On this shaft is a sprocket 30 connected by the chain 12 to the sprocket 11 on the shaft 6a, and intermediately engaging with the sprocket 13 on the auger shaft 9, so that in operation the power take-off shaft 28 is rotated causing the bucket line 5 to operate through the shaft 6a, and at the same time rotating through the sprocket 13 the shaft 9 with the loosely mounted bucket chain wheels 7 thereon, as already explained.

In Fig. 4 instead of the auger feed we may use a chute or chutes 31 inserted in the floor 3a of the truck 1, while the elevator 2 is positioned centrally instead of at the end of the body, as shown in Figs. 1 and 3. This construction is particularly adapted to meet requirements when more than one chute 31 is employed, as by centrally positioning the elevator, room is made for another chute or chutes, and also particularly applies when the mechanism is required for unloading purposes only, when the extension can be dispensed with and only the box auger unit or the chutes 31 are employed.

It will be understood that one or more auger feeds 9 in the bottom of the body may be added parallel to one another to form twin or multiple feed, or the same feed may be continued from the back of the truck to the discharge chute 14, thus eliminating the elevator.

In operation the truck being driven to the required destination, the extension auger feed is swung into contact with the material to be loaded, such as grain; the engine of the truck is then connected to the shaft 28 simultaneously operating the feed auger to load material and the elevator 2 to discharge the material, so loaded, either into the truck or elsewhere by means of the discharge chute 14. While the truck is travelling, the lever handle 26 has been operated to practically lock the bucket line of the elevator, and thus eliminate damage thereto by vibration while the body is travelling from one point to another.

Various changes may be made in the construction and arrangement of the invention above set forth without departing from the real purpose and spirit thereof, and it is the intention to cover by the following claims any modified forms of structure or use of equivalents, which may reasonably be included within their scope.

What we claim for our invention is:—

1. In a device of the character described for loading, transporting and unloading grain and the like, and in combination, a load-receiving body, an elevator suitably mounted on the body, a loading conveyor provided with a swingable extension co-operative with the elevator arranged beneath the body, a shaft common to the elevator and to the conveyor and means for transmitting power to said shaft.

2. In a transportable device of the character described, in combination, a load-receiving body, an elevator associated with said body, a conveyor beneath the body communicating with the elevator and means for simultaneously operating the elevator and the conveyor, manually operable means associated with the elevator for locking it, comprising presser plates suitably mounted relative to the elevator units and normally out of contact therewith, pivotally mounted cross-members associated with the presser plates and lever means for manually operating said members from without to operate the presser plates to engage with and bear against the elevator units.

3. In a device of the character described, a bucket line elevator and means for locking the elevator comprising movably mounted pressure plates in substantially vertical alignment with the bucket line, and normally out of contact therewith, toggle cross rods pivotally associated with said plates and means for operating the rods to cause the pressure plates to clamp and lock the bucket line.

4. In a device of the character described, for loading, transporting and unloading grain and the like, and in combination, a load-receiving body, an elevator suitably mounted on the body, a loading conveyor provided with a swingable extension co-operative with the elevator, a shaft common to the elevator and to the conveyor, and means for transmitting power from the truck to said shaft.

JOHN EDDIE VALI.
WENER VALI.
STAINOR VALI.
WALTER VALI.